US011949754B1

(12) United States Patent
Chung et al.

(10) Patent No.: US 11,949,754 B1
(45) Date of Patent: Apr. 2, 2024

(54) CONTENT CACHING OPTIMIZATION SYSTEM AND METHOD

(71) Applicant: Foundation of Soongsil University-Industry Cooperation, Seoul (KR)

(72) Inventors: Yun Won Chung, Seoul (KR); Min Wook Kang, Namyangju-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 18/086,493

(22) Filed: Dec. 21, 2022

(30) Foreign Application Priority Data

Oct. 13, 2022 (KR) .......................... 10-2022-0131159
Nov. 16, 2022 (KR) .......................... 10-2022-0153350

(51) Int. Cl.
*H04L 67/568* (2022.01)
*H04L 41/122* (2022.01)
*H04L 67/63* (2022.01)

(52) U.S. Cl.
CPC .......... *H04L 67/568* (2022.05); *H04L 41/122* (2022.05); *H04L 67/63* (2022.05)

(58) Field of Classification Search
CPC ...... H04L 67/568; H04L 41/122; H04L 67/63
See application file for complete search history.

(56) References Cited

U.S. PATENT DOCUMENTS

| 10,261,938 | B1 * | 4/2019 | Jenkins | ............... | G06F 16/9574 |
| 2021/0312277 | A1 * | 10/2021 | Prabhudesai | ....... | G06F 11/3466 |
| 2022/0400295 | A1 * | 12/2022 | Bogatin | ........... | H04N 21/26258 |

FOREIGN PATENT DOCUMENTS

| KR | 10-1904482 B1 | 10/2018 |
| KR | 10-2021-0002395 A | 1/2021 |

(Continued)

OTHER PUBLICATIONS

Shuja et al. Applying Machine Learning Techniques for Caching in Next-Generation Edge Networks: A Comprehensive Survey, Nov. 3, 2020, Journal of Network and Computer Applications, Record 12, p. 1-40 (Year: 2020).*

(Continued)

*Primary Examiner* — Tonia L Dollinger
*Assistant Examiner* — Joseph M Cousins
(74) *Attorney, Agent, or Firm* — Stein IP, LLC (57) ABSTRACT

Provided are a content caching optimization system and method. The content caching optimization system in which content priority in an information-centric networking (ICN) environment is taken into consideration includes one or more producer terminals configured to generate and provide content, one or more user terminals configured to transmit content requests according to users and receive content according to the content requests, one or more mobile/multiple access edge computings (MECs) configured to predict the number of requests for each piece of content to be requested later on the basis of the content requests received from the user terminals, and a software-defined network (SDN) controller configured to calculate a content popularity using the number of requests for each piece of content predicted by the MECs and perform content caching optimization on the basis of the calculated content popularity and a preset content priority.

8 Claims, 3 Drawing Sheets

(56) References Cited

FOREIGN PATENT DOCUMENTS

KR     10-2235622 B1     4/2021
KR     10-2252896 B1     5/2021

OTHER PUBLICATIONS

Yao, On Mobile Edge Caching, 2019, IEEE Communications Surveys & Tutorials, vol. 21, No. 3, p. 1-29 (Year: 2019).*
Lekharu et al. Deep Learning Model for Content Aware Caching at MEC Servers, Jun. 2022, IEEE Transactions on Network and Service Management, vol. 19, No. 2, p. 1-13 (Year: 2022).*
Jordehi, A review on constraint handling strategies in particle swarm optimisation, Jan. 7, 2015, Neural Computing and Applications. p. 1-12 (Year: 2015).*
Guo et al. Z-Shaped Transfer Functions for Binary Particle Swarm Optimization Algorithm, Jun. 8, 2020, Computational Intelligence and Neuroscience, p. 1-21 (Year: 2020).*
Tam, A Gentle Introduction to Particle Swarm Optimization, Retreived from <https://machinelearningmastery.com/a-gentle-introduction-to-particle-swarm-optimization/> on Jan. 31, 2024, p. 1-29 (Year: 2021).*
Chen et al. Using Particle Swarm Optimization Algorithm in Multimedia CDN Content Placement, , 2012 Fifth International Symposium on Parallel Architectures, Algorithms and Programming, Taipei, Taiwan, 2012, pp. 45-51 (Year: 2012).*

* cited by examiner

CONTENT CACHING OPTIMIZATION SYSTEM AND METHOD

CROSS-REFERENCE TO RELATED APPLICATIONS

This application claims the benefit of Korean Application No. 10-2022-0131159, filed Oct. 13, 2022, and Korean Application No. 10-2022-0153350, filed Nov. 16, 2022, in the Korean Intellectual Property Office. All disclosures of the documents named above are incorporated herein by reference.

BACKGROUND

1. Field of the Invention

The present invention relates to a content caching optimization system and method in which content priority in an information-centric networking (ICN) environment is taken into consideration, and more particularly, to a content caching optimization system and method in which content priority in an ICN environment is taken into consideration, for performing content caching optimization in consideration of content priority according to a user or a producer.

2. Discussion of Related Art

Information-centric networking (ICN) is networking in which routing is performed on the basis of the name of content. The ICN is known to have better performance than the existing communication method of performing routing on the basis of the address of a destination.

In such ICN, content having high popularity is simply cached at a location close to a user on the basis of content popularity in each edge network and provided to the user.

However, popularity in an edge network is bias information in terms of the overall network and thus is too inaccurate to be applied to a core network.

Also, in the ICN, all pieces of cached content have different characteristics and thus act as factors that affect a user's quality of experience (QoE). However, such characteristics of content are not taken into consideration, and thus a user's QoE is degraded.

Therefore, it is necessary to develop a technology for preventing a user's QoE from being degraded by considering characteristics of different pieces of content in ICN.

RELATED ART DOCUMENTS

Patent Documents (Patent document 0001) Korean Patent No. 10-1904482

SUMMARY OF THE INVENTION

The present invention is directed to providing a content caching optimization system and method in which content priority in an information-centric networking (ICN) environment is taken into consideration, for predicting the number of requests for each content based on content requests transmitted by users, calculating content popularity using the predicted number of requests for each content, and performing content caching optimization based on the calculated content popularity and a preset content priority.

According to an aspect of the present invention, there is provided a content caching optimization system in which content priority in an ICN environment is taken into consideration, the content caching optimization system including one or more producer terminals configured to generate and provide content, one or more user terminals configured to transmit content requests according to users and receive content according to the content requests, one or more mobile/multiple access edge computings (MECs) configured to predict the number of requests for each content to be requested later based on the content requests received from the user terminals, and a software-defined network (SDN) controller configured to calculate a content popularity using the number of requests for each content predicted by the MECs and perform content caching optimization on based on the calculated content popularity and a preset content priority.

The MECs may collect content requests received from the user terminal for a preset input time and predict the number of requests for each content for a preset output time by inputting the collected content requests to a previously trained time-series prediction machine learning model.

The SDN controller may aggregate the number of requests for each content received from the MECs for a preset input time, calculate a content popularity by normalizing the aggregated number of requests for each content, calculate an optimal solution based on the content popularity and the content priority using a binary particle swarm optimization (BPSO) algorithm, and derive a content caching state for minimizing a cost of transmitting the content by performing the content caching optimization using the calculated optimal solution.

To calculate the optimal solution based on the content popularity and the content priority, the SDN controller may use a quality of experience (QoE) constraint that an average content transmission cost is to be satisfied according to the content priority, and may determine that the QoE constraint is satisfied when an average content transmission cost of the content for which the content priority is set is smaller than a preset threshold value.

The content caching optimization system may further include one or more routers configured to connect a path for transmitting the content provided by the producer terminals to the user terminals, and the MECs, the routers, and the producer terminals may perform content caching based on the content caching state received from the SDN controller through an ICN caching procedure and update a forwarding information base (FIB) which is a routing table of an ICN.

According to another aspect of the present invention, there is provided a content caching optimization method, the content caching optimization method including transmitting, by a user terminal, content requests, predicting, by an MEC, the number of requests for each content to be requested later based on the content requests received from the user terminal, and calculating, by an SDN controller, a content popularity using the number of requests for each content predicted by the MEC and performing content caching optimization based on the calculated content popularity and a preset content priority.

The predicting the number of requests for each content may include collecting content requests received from the user terminal for a preset input time and predicting the number of requests for each content for a preset output time by inputting the collected content requests to a previously trained time-series prediction machine learning model.

The performing the content caching optimization may include aggregating the number of requests for each content received from the MEC for a preset input time, normalizing the aggregated number of requests for each content to calculate a content popularity, calculating an optimal solution based on the content popularity and the content priority using a BPSO algorithm, and performing the content caching optimization using the calculated optimal solution to derive a content caching state for minimizing a cost of transmitting the content.

The performing the content caching optimization to derive the content caching state may include using a quality of experience (QoE) constraint that an average content transmission cost is to be satisfied according to the content priority to calculate the optimal solution based on the content popularity and the content priority, and determining that the QoE constraint is satisfied when an average content transmission cost of the content for which the content priority is set is smaller than a preset threshold value.

The content caching optimization method may further include connecting, by one or more routers, a path for transmitting the content provided by a producer terminal to the user terminal, and performing, by the MEC, the routers, and the producer terminal, content caching based on the content caching state received from the SDN controller through an ICN caching procedure and updating an FIB which is a routing table of an ICN.

According to one aspect of the present invention described above, the inaccurate and biased content popularity estimation problem in MEC can be solved through a content caching optimization system and content caching optimization method, in which content priority in an information-centric networking (ICN) environment is taken into consideration.

Further, it is possible to provide an optimal content caching state in which the content transmission cost is minimized on the content providing side and the content consuming side through a content caching optimization system and content caching optimization method in which content priority in an information-centric networking (ICN) environment is taken into consideration.

Accordingly, by providing a content caching optimization system and content caching optimization method in which content priority in an information-centric networking (ICN) environment is taken into consideration, it is possible to apply an information-centric networking in a 5G MEC environment.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The following detailed description of the present invention refers to the accompanying drawings that show, as an example, specific embodiments in which the present invention may be implemented. These embodiments may be described in sufficient detail to enable those of ordinary skill in the art to implement the present invention. It should be understood that various embodiments of the present invention are different but are not mutually exclusive. For example, certain shapes, structures, and characteristics stated herein may be implemented in other embodiments without departing from the spirit and scope of the present invention in connection with an embodiment. It should also be understood that the positions or arrangement of individual elements in each disclosed embodiment may be varied without departing from the spirit and scope of the present invention. Therefore, the following detailed description is not to be taken in a limiting sense, and the scope of the present invention is limited only by the appended claims along with the full scope of equivalents to which the claims are entitled when properly explained. In the drawings, like reference numerals refer to the same or similar functions throughout several aspects.

Hereinafter, exemplary embodiments of the present invention will be described in detail with reference to the accompanying drawings.

Figure 1:
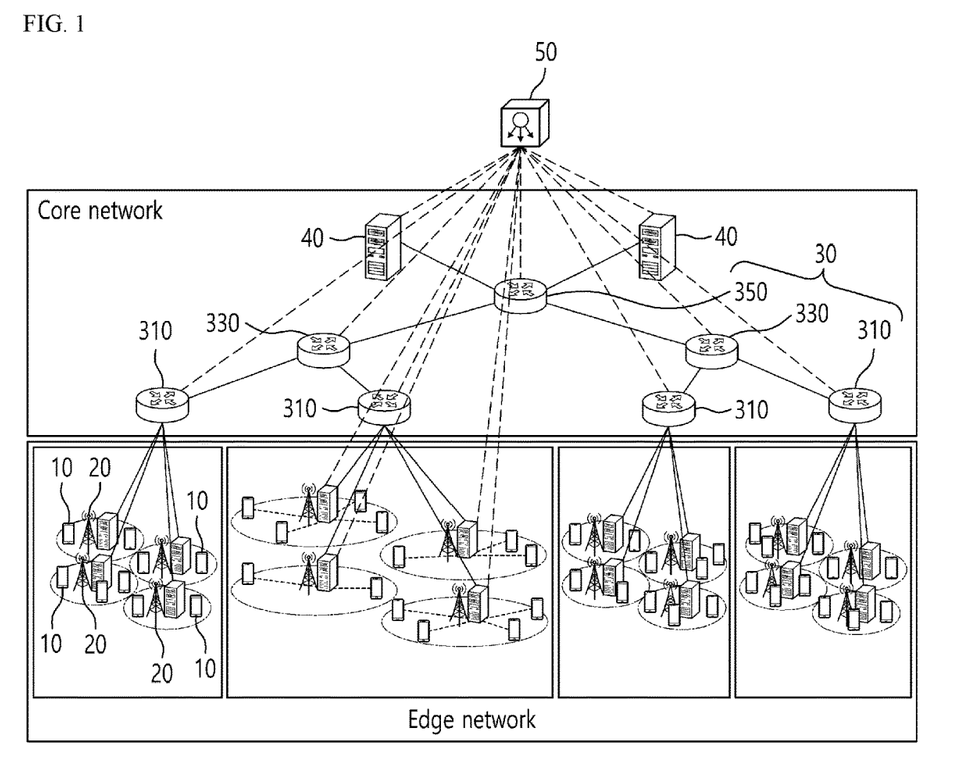
FIG. 1 is a diagram of a content caching optimization system according to an exemplary embodiment of the present invention.
Figure 2:
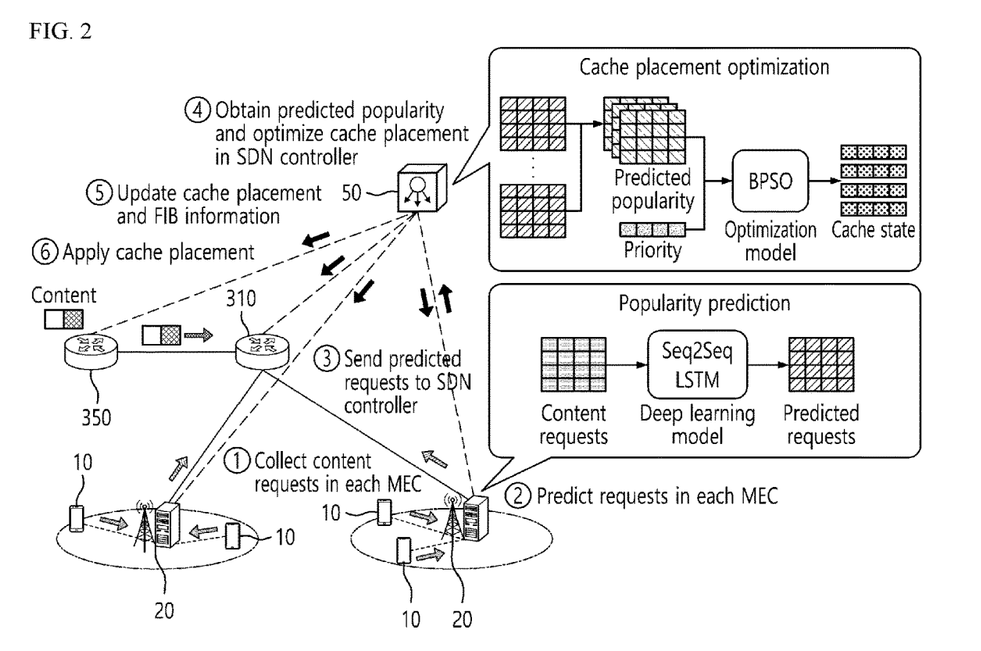
FIG. 2 is a diagram illustrating a content caching optimization process in the content caching optimization system of FIG. 1.
Figure 3:
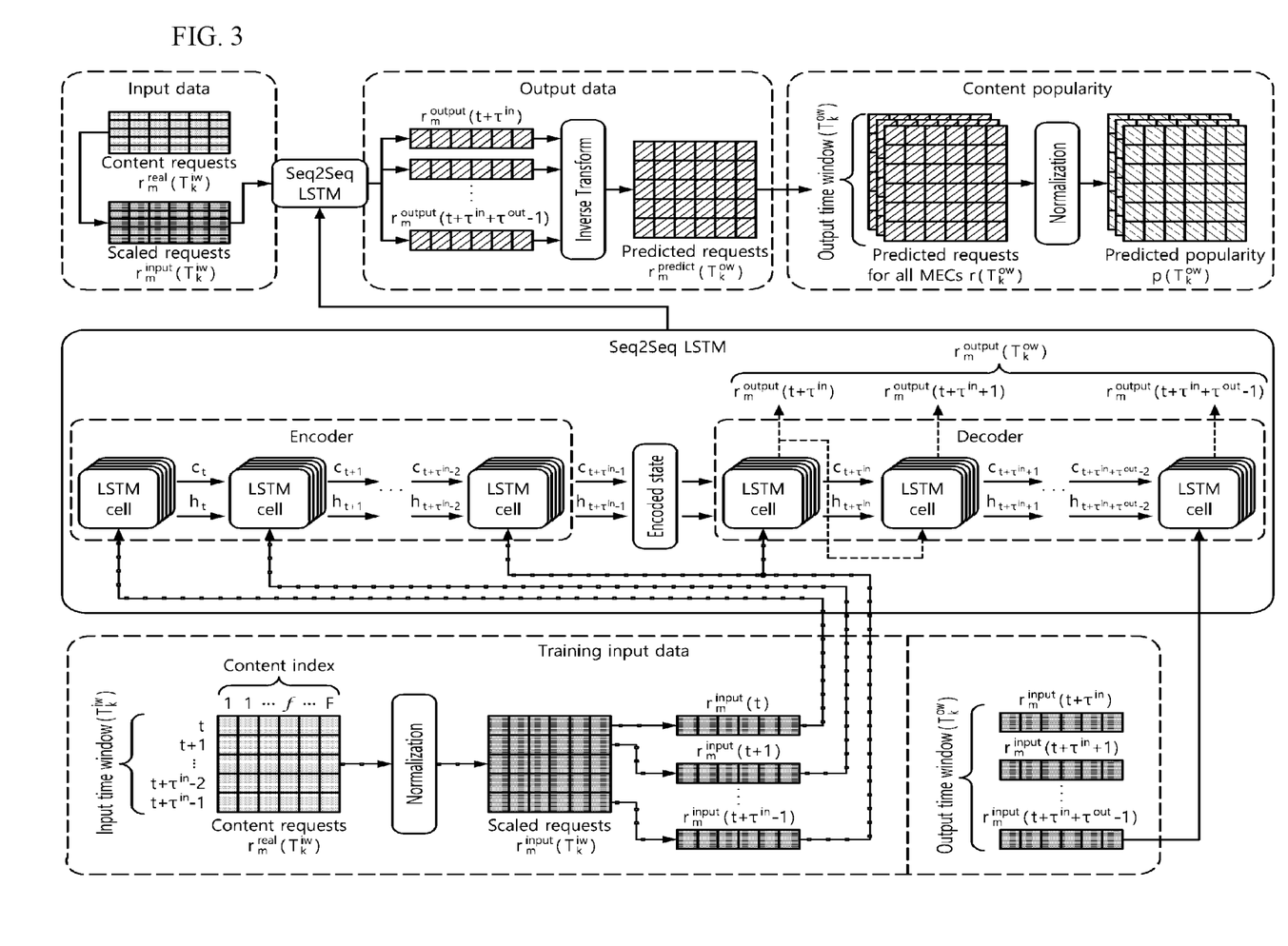
FIG. 3 is a diagram illustrating a process in which a mobile/multiple access edge computing (MEC) of FIG. 1 predicts the number of requests for each content and a process in which a software-defined network (SDN) controller calculates a content popularity.

FIG. 1 is a diagram of a content caching optimization system according to an exemplary embodiment of the present invention, FIG. 2 is a diagram illustrating a content caching optimization process in the content caching optimization system of FIG. 1, and FIG. 3 is a diagram illustrating a process in which a mobile/multiple access edge computing (MEC) of FIG. 1 predicts the number of requests for each content and a process in which a software-defined network (SDN) controller calculates a content popularity.

Referring to FIG. 1, in a content caching optimization system 1 in which content priority in an information-centric network (ICN) environment is taken into consideration (hereinafter, "optimization system") according to the exemplary embodiment of the present invention, an MEC 20 predicts the number of requests for each content, and an SDN controller 50 calculates a content popularity on the basis of the prediction and performs content caching optimization on the basis of the calculated content popularity and a preset content priority.

In this regard, an ICN environment may include an edge network and a core network.

More specifically, the ICN environment may include the edge network including one or more user terminals 10 and the MEC 20 located in a base station. Since the MECs 20 are located in one or more base stations provided in the edge network, the number of MECs 20 may be one or more in accordance with the number of base stations.

Also, the ICN environment may include the core network including one or more routers 30 connected to the one or more MECs 20 of the edge network and one or more producer terminals 40 which generate content.

Accordingly, the SDN controller 50 included in the optimization system 1 according to the present invention may participate in content caching and transmission in connection with each of the MECs 20, the routers 30, and the producer terminals 40.

The producer terminals 40, the user terminals 10, the MECs 20, the SDN controller 50, and the routers 30 included in the optimization system 1 according to the present invention will be described in detail below with reference to FIGS. 2 and 3.

The optimization system 1 according to the present invention may include one or more producer terminals 40, user terminals 10, MECs 20, and routers 30. However, for convenience of description, the one or more producer terminals 40, user terminals 10, MECs 20, and routers 30 may be described as one producer terminal 40, user terminal 10, MEC 20, and router 30 and are not limited thereto.

Referring to FIG. 2, the one or more producer terminals 40 generate and provide content.

The producer terminal 40 may receive content caching states in connection with the SDN controller 50 or provide content to the user terminal 10 which requests the content by transmitting the content to the router 30 connected in the core network.

The user terminal 10 transmits a content request in accordance with a user and receives content in accordance with the content request.

The user terminal 10 may transmit the content request through a base station present within a certain distance and receive the content in accordance with the content request.

Here, the user terminal 10 may transmit the content request and receive the content through the MEC 20 present in the base station.

In this regard, the producer terminal 40 and the user terminal 10 may be terminals owned by a producer and the user and may be any smart computing device such as a desktop personal computer (PC), a laptop PC, a smartphone, a tablet PC, etc.

The MEC 20 may predict the number of requests for each content to be requested later on the basis of the content request provided by the user terminal 10.

The MEC 20 may receive the content request from one or more user terminals 10 present within the certain distance from the base station and transmit the number of requests for each content based on such content requests to the router 30 and the SDN controller 50 in the core network.

The MEC 20 may collect content requests received from the user terminals 10 for a preset input time and predict the number of requests for each content using a previously trained time-series prediction machine learning model, specifically, predict the number of requests for each content for a preset output time by inputting the collected content requests to the time-series prediction machine learning model.

To this end, the MEC 20 may train a time-series prediction machine learning model using previously prepared training data. The machine learning model to be trained may be a long short-term memory (LSTM), a gated recurrent unit (GRU), etc. which is a recurrent neural network (RNN) model and may also be a bidirectional RNN, a bidirectional LSTM, a bidirectional GRU, a seq2seq LSTM, a seq2seq GRU, a stacked RNN, a stacked LSTM, a stacked GRU, etc. which is a specialized form of each model.

More specifically, referring to FIG. 3, the MEC 20 may receive the number of content requests $r_m^{real}(T_k^{iw})=\{\{r_m^{real}(t)|m\in \mathcal{M}, \forall f\in \mathcal{F}, t\in T_k^{iw}\}$ for a preset input time $T_k^{iw}$, $k\in \mathcal{K}=\{1, 2, 3, \ldots, k\}$ and predict the number of requests for each content $f\in \mathcal{K}=\{1, 2, 3 \ldots, F\}$ for a preset output time $T_k^{ow}$ using a time-series prediction machine learning model.

The SDN controller 50 calculates a content popularity using the number of requests for each content predicted by the MEC 20.

The SDN controller 50 may receive the number of requests for each content from all MECs 20 present in an ICN.

More specifically, the SDN controller 50 may aggregate the number of requests for each content received from the MECs 20 for the preset input time and calculate a content popularity $p(T_k^{ow})=\{p_{m,f}(t)|\forall m\in \mathcal{M}, \forall f\in \mathcal{F}, t\in t_k^{ow}\}$ by normalizing the aggregated number of requests $r_m^{predict}(T_k^{ow})$ for each content.

Here, the SDN controller 50 may calculate a content popularity $p_{m,f}(t)$ having a value from 0 to 1 through the normalization process. A process in which the SDN controller 50 calculates a content popularity on the basis of the number of requests for each content predicted by the MEC 20 is shown in FIG. 3.

Subsequently, the SDN controller 50 performs content caching optimization based on the calculated content popularity and a preset content priority $q_f$.

Here, the content priority $q_f$ may represent the importance of content or may be used as a factor that affects a content transmission cost. A priority level for allocating the content priority $q_f$ may be set in advance by the producer terminal 40 which generates and provides content, or the user terminal 10 which requests content.

The content priority $q_f$ means the priority of any one piece of content f and may have a value from 0 to 1. When the value is higher, the SDN controller 50 may determine the piece of content f to have a higher priority.

For example, when content priority levels set by the producer terminal 40 or the user terminal 10 are low, medium and high, the content priority $q_f$ may have a value of $q_f\in \{q_{low}, q_{medium}, q_{high}\}$, and the content priority values may have the following relationship: $q_{low}<q_{medium}<q_{high}$.

Meanwhile, the SDN controller 50 may display caching states $x_{i,f}$ of all the MECs 20, routers 30, and producer terminals 40 as 0 or 1.

Here, the caching states $x_{i,f}$ may be defined by Expression 1 below.

$$x_{i,f} = \begin{cases} 1, & \text{if router } i \text{ caches content } f, \\ 0, & \text{otherwise} \end{cases} \quad \text{[Expression 1]}$$

Here, the SDN controller 50 may display the caching states $x_{i,f}$ as 1 when i corresponding to each of the MECs 20, routers 30, and producer terminals 40 caches content f, and may display the caching states $x_{i,f}$ as 0 otherwise.

The SDN controller 50 may calculate a content transmission cost incurred when any one user terminal 10 receives content from an MEC 20, a router 30, or a producer terminal 40 that is closest to the user terminal 10 among all MECs 20, routers 30, and producer terminals 40 caching content.

The content transmission cost may be defined by Expression 2 below.

$$c_{m,f}(x)=\Sigma_{i\in B_m}(\gamma_{i,m}+\gamma_m)x_{i,f}\Pi_{j\in B'_{m,i}}(1-x_{i,f}) \quad \text{[Expression 2]}$$

Here, $c_{m,f}(x)$ is a cost incurred when the user terminal 10 connected to a base station in which m corresponding to any one MEC 20 is located receives the content f, $\gamma_{i,m}$ is a content transmission cost from i corresponding to MECs 20, routers 30, and producer terminals 40 to m corresponding to any one MEC 20, $\gamma_m$ is a content transmission cost from m corresponding to any one MEC 20 to the user terminal 10, $B_m\subseteq \mathcal{V}\cup \mathcal{N}\cup \mathcal{M}$ is a set including the MECs 20, the routers 30, and the producer terminals 40 arranged in order of increasing content transmission cost from each of the MECs 20, the routers 30, and the producer terminals 40 to m corresponding to any one MEC 20, and $B'_{m,i}$ is a subset of $B_m$ including MECs 20, routers 30, and producer terminals 40 other than those having a smaller content transmission cost than a content transmission cost from i corresponding to the MECs 20, the routers 30, and the producer terminals 40 to m corresponding to any one MEC 20.

Accordingly, using Expression 2, the SDN controller 50 may calculate a content transmission cost incurred when any one user terminal 10 receives content from the closest MEC 20, router 30, or producer terminal 40.

Also, the SDN controller 50 may calculate a total content transmission cost to the user terminal 10 connected to all the MECs 20 for a caching determination time $T_k^{ow}$ using a content transmission weight indicator which is represented as a weighted sum of the calculated content transmission costs, content popularities, and content priorities.

Here, the content transmission weight indicator may be defined by Expression 3 below, and the total content transmission cost may be defined by Expression 4 below.

$$\alpha p_{m,f}(t) + (1-\alpha)q_f \qquad \text{[Expression 3]}$$

$$C(x) = \Sigma_{t \in T_k^{ow}} \Sigma_{m \in \mathcal{M}} \Sigma_{f \in \mathcal{F}} c_{m,f}(x)(\alpha p_{m,f}(t) + (1-\alpha)q_f) \qquad \text{[Expression 4]}$$

In this regard, the SDN controller 50 may calculate an optimal solution based on content popularity and content priority using a binary particle swarm optimization (BPSO) algorithm.

Here, the optimal solution is an optimal solution to a derivation formula for deriving a content caching state in which a content transmission cost is minimized using an objective function.

The derivation expression for deriving a content caching state in which a content transmission cost is minimized using an objective function may be defined by Expression 5 below.

$$\min_{x} C(x) \qquad \text{[Expression 5]}$$

Here, the derivation expression may be an optimization expression including an inequality constraint function.

Accordingly, to calculate an optimal solution based on content popularity and content priority, that is, an optimal solution defined by Expression 5, the SDN controller 50 may use a quality of experience (QoE) constraint that an average content transmission cost is to be satisfied according to content priority.

More specifically, the SDN controller 50 may calculate an optimal solution using an objective function that is redefined through a penalty function of different constraints including the QoE constraint.

Here, the different constraints may be defined by Expressions 6 to 9 below, and the objective function may be redefined by Expression 10 below.

$$x_{i,f} = 1, \forall i \in \mathcal{V}, \forall f \in \mathcal{F} \qquad \text{[Expression 6]}$$

Expression 6 is a constraint that all the producer terminals 40 have all the contents they created.

$$\Sigma_{i \in} \mathcal{V} \mathcal{N} \cup \mathcal{M} \, x_{i,f} \geq 1, \forall f \in \mathcal{F} \qquad \text{[Expression 7]}$$

Expression 7 is a constraint that all content is to be cached in one or more MECs 20, routers 30, or producer terminals 40.

$$\Sigma_{f \in} \mathcal{F} x_{i,f} \leq |\mathcal{S}_i|, \forall i \in \mathcal{V} \cup \mathcal{N} \cup \mathcal{M} \qquad \text{[Expression 8]}$$

Expression 8 is a constraint that the number of pieces of content which may be cached in the MECs 20, the routers 30, and the producer terminals 40 is limited.

$$\frac{\Sigma_{m \in \mathcal{M}} \Sigma_{f \in \mathcal{F}_l} r_{m,f} c_{m,f}(x)}{\Sigma_{m \in \mathcal{M}} \Sigma_{f \in \mathcal{F}_l} r_{m,f}} \leq Th_l, \forall l \in \mathcal{L}, t \in T_k^{ow} \qquad \text{[Expression 9]}$$

Expression 9 is a QoE constraint that an average content transmission cost is to be satisfied according to content priority.

In this regard, when an average content transmission cost of content f whose content priority l is set in advance is smaller than a preset threshold value $Th_f \in (Th_{low}, Th_{medium}, Th_{high})$, the SDN controller 50 may determine that the QoE constraint is satisfied.

Here, satisfying the QoE constraint may be satisfying QoE which is set for the user terminal 10.

$$J(x, \zeta) = \qquad \text{[Expression 10]}$$

$$C(x) + \zeta E(x) = \sum_{t \in T_k^{ow}} \sum_{m \in \mathcal{M}} \sum_{f \in \mathcal{F}} c_{m,f}(x)(\alpha p_{m,f}(t) +$$

$$(1-\alpha)q_f) + \frac{\zeta}{2} \Big( \sum_{f \in \mathcal{F}} \max\Big\{0, 1 - \sum_{i \in \mathcal{V} \cup \mathcal{N} \cup \mathcal{M}} x_{i,f}\Big\}^2 +$$

$$\sum_{i \in \mathcal{V} \cup \mathcal{N} \cup \mathcal{M}} \max\Big(0, \sum_{f \in \mathcal{F}} x_{i,f} - |\mathcal{S}_i|\Big)^2 +$$

$$\sum_{l \in \mathcal{L}} \max\Bigg\{0, \frac{\sum_{m \in \mathcal{M}} \sum_{f \in \mathcal{F}} r_{m,f} c_{m,f}(x)}{\sum_{m \in \mathcal{M}} \sum_{f \in \mathcal{F}} r_{m,f}} - Th_l \Bigg\}^2 \Bigg)$$

Expression 10 is an objective function redefined through a penalty function of different constraints (Expressions 7 and 8) including the QoE constraint (Expression 9), and $\zeta$ is a variable meaning a penalty factor and may be increased every time iteration predefined in advance for the objective function to converge is finished.

In this regard, the SDN controller 50 may calculate an optimal solution using a BPSO algorithm which is a meta-heuristic algorithm because the above objective function belongs to a nondeterministic polynomial-time (NP)-hard problem in mixed integer nonlinear programming.

Accordingly, the SDN controller 50 may derive a content caching state for minimizing a content transmission cost by performing content caching optimization through the calculated optimal solution.

The content caching state may be defined by Expression 11 below.

$$x_{i,f} \in \{0,1\}, \forall i \in \mathcal{V} \cup \mathcal{N} \cup \mathcal{M}, \forall f \in \mathcal{F} \qquad \text{[Expression 11]}$$

Expression 11 is a constraint for defining the content caching state derived through content caching optimization and MECs 20, routers 30, and producer terminals 40 that correspond to the content caching state for minimizing a content transmission cost.

In this way, the SDN controller 50 may perform a content caching optimization procedure on the basis of the optimal solution calculated through the above process as shown in Table 1 below to derive a content caching state for minimizing a content transmission cost.

TABLE 1

Algorithm 1 Content placement optimization procedure

Initialization: Content requests $r^{real}_m(t)$, cache state x, prediction process PRD( ), optimization process OPT( ), time $t \in T$, cache placement time index $k \in K$, MEC set M, content set F and content priority set q

```
 1:     for t do
 2:         for m ∈ M do
 3:             if MEC m receives request for content f then
 4:                 MEC m collects content requests r^real_mf(t)
 5:             end if
 6:             if t = T^ow_k then
 7:                 r^predict_m(T^ow_k) = PRD(r^real_m(T^iw_k))
 8:                 MEC i sends r^predict_m(T^ow_k) to SDN controller
 9:             end if
10:         end for
11:         if SDN controller receives r^predict_m(T^ow_k) from all MECs then
12:             SDN controller initializes a and calculates p(T^ow_k) by normalizing r(T^ow_k)
13:             Find optimal solution
                    x = OPT(x, p(T^ow_k), q, r(T^ow_k))
14:         end if
15:     end for
```

Meanwhile, the SDN controller 50 may transmit the derived content caching state to all the MECs 20, routers 30, and producer terminals 40 connected in the ICN.

Here, the routers 30 connect a path for transmitting content provided by the producer terminals 40 to the user terminals 10. The routers 30 may be provided as an edge core router 310 connected to the one or more MECs 20 included in the edge network, a root core router 350 connected to the one or more producer terminals 40, and a core router 330 connected to the edge core router 310 and the root core router 350.

In this regard, all the MECs 20, routers 30, and producer terminals 40 may perform ICN-based content caching on the basis of the content caching state received from the SDN controller 50 through an ICN caching procedure.

More specifically, all the MECs 20 and routers 30 may identify content caching states corresponding thereto, and when the content caching state is 0 and corresponding content is currently cached, may delete the content.

Also, all the MECs 20 and routers 30 may identify content caching states corresponding thereto, and when the content caching state is 1, may identify a previous caching state so that an MEC 20, a router 30, or a producer terminal 40 caching the corresponding content is determined.

All the MECs 20 and routers 30 may select an MEC 20, a router 30, and a producer terminal 40 having the minimum content transmission cost from an MEC 20, a router 30, or a producer terminal 40 caching corresponding content thereto and transmit interest to the selected MEC 20, router 30, and producer terminal 40.

When the content caching operation is completed, all the MECs 20 and routers 30 may transmit a content-caching completion message to the SDN controller 50.

Accordingly, when content-caching completion messages are received from all the MECs 20 and routers 30, the SDN controller 50 may modify a forwarding information base (FIB) in the network and transmit the modified FIB to all the MECs 20, routers 30, and producer terminals 40.

Therefore, all the MECs 20, routers 30, and producer terminals 40 may update an FIB which is a routing table of the ICN.

The FIB updated by all the MECs 20, routers 30, and producer terminals 40 may be an FIB of each of the MECs 20, the routers 30, and the producer terminals 40 present therein to be updated on the basis of the FIB received from the SDN controller 50.

In this way, the optimization system 1 performs the above process, thereby solving the problem of inaccurate and biased content popularity estimation by the MECs 20.

Also, the optimization system 1 performs content caching optimization for minimizing a content transmission cost from a content provider side to a content consumer side under different constraints, thereby preventing a user's QoE regarding content having different characteristics from being degraded.

Further, the optimization system 1 can allow application of ICN to an actual network environment, such as a fifth generation (5G) MEC environment, through an ICN procedure for content caching optimization.

Figure 4:
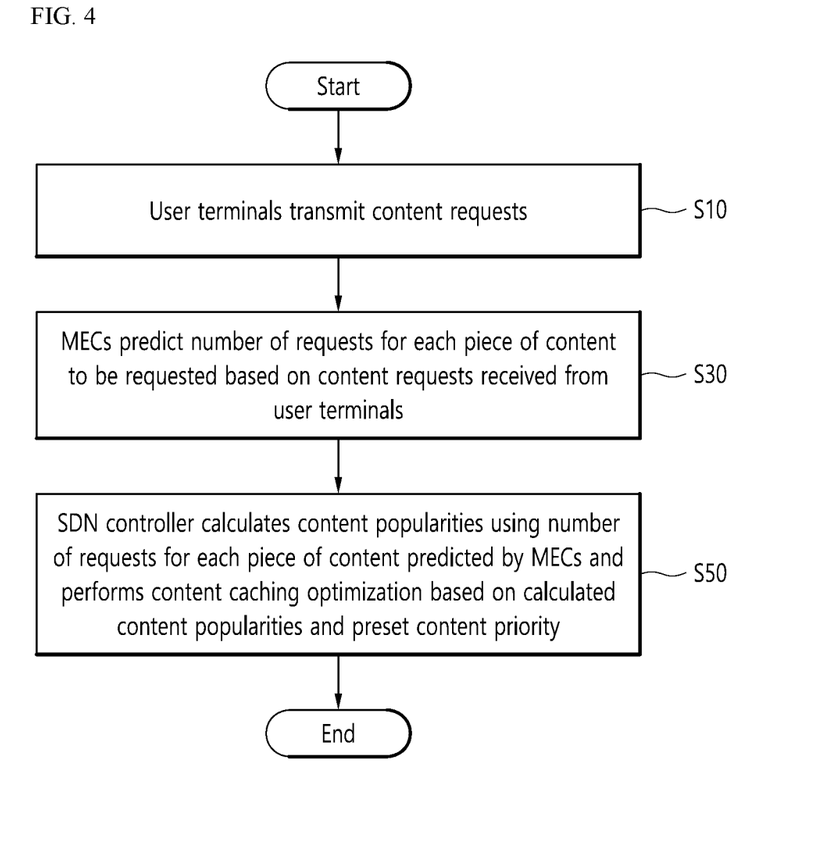
FIG. 4 is a flowchart of a content caching optimization method according to another exemplary embodiment of the present invention.

Meanwhile, FIG. 4 is a flowchart of a content caching optimization method according to another exemplary embodiment of the present invention. Since the content caching optimization method according to the present invention is performed by substantially the same configuration as that of the content caching optimization system 1 shown in FIGS. 1 to 3, the same reference numerals will be given to the same elements as those of the content caching optimization system 1 of FIGS. 1 to 3, and repeated descriptions will be omitted.

Referring to FIG. 4, the content caching optimization method according to the present invention is performed by the content caching optimization system 1 including the one or more user terminals 10, the one or more MECs 20, the one or more producer terminals 40, and the SDN controller 50.

The content caching optimization method includes a step S10 in which the user terminals 10 transmit content requests.

Also, the content caching optimization method includes a step S30 in which the MECs 20 predict the number of requests for each content to be requested later on the basis of the content requests received from the user terminal 10.

Here, the MECs 20 may collect the content requests received from the user terminals 10 for a preset input time and predict the number of requests for each content using a previously trained time-series prediction machine learning model, specifically, predict the number of requests for each content for a preset output time by inputting the collected content requests to the time-series prediction machine learning model.

Further, the content caching optimization method includes a step S50 in which the SDN controller 50 calculates a content popularity using the number of requests for each content predicted by the MECs 20 and performs content caching optimization on the basis of the calculated content popularity and a preset content priority.

Here, the SDN controller 50 may aggregate the number of requests for each \content received from the MECs 20 for a preset input time and calculate a content popularity by normalizing the aggregated number of requests for each content.

Then, the SDN controller 50 may calculate an optimal solution based on the content popularities and the content priorities using a BPSO algorithm and derive a content caching state for minimizing a content transmission cost by performing content caching optimization through the calculated optimal solution.

To calculate the optimal solution based on the content popularities and the content priorities, the SDN controller 50 may use a QoE constraint that an average content transmission cost is to be satisfied according to the content priorities.

When an average content transmission cost of content for which the content priority is set is smaller than a preset threshold value, the SDN controller 50 may determine that the QoE constraint is satisfied.

The content caching optimization system 1 may further include one or more routers 30 that connect a path for transmitting content provided by the producer terminals 40 to the user terminals 10.

In this regard, the content caching optimization method may further include a step in which the MECs 20, the routers 30, and the producer terminals 40 perform content caching on the basis of the content caching state received from the SDN controller 50 through an ICN caching procedure and update an FIB which is a routing table of an ICN.

In this way, the optimization system 1 performs the content caching optimization method, thereby solving the problem of inaccurate and biased content popularity estimation by the MECs 20.

Also, the optimization system 1 performs content caching optimization for minimizing a content transmission cost from a content provider side to a content consumer side under different constraints, thereby preventing a user's QoE regarding content having different characteristics from being degraded.

Further, the optimization system 1 can allow application of ICN to an actual network environment, such as a 5G MEC environment, through an ICN procedure for content caching optimization.

Although various exemplary embodiments of the present invention have been illustrated and described above, the present invention is not limited to the above-described specific exemplary embodiments. Various modifications can be made by those of ordinary skill in the art without departing from the spirit of the claims, and the modified embodiments should not be understood separately from the technical spirit or overall view of the present invention.

REFERENCE NUMERAL

1: content cashing optimization system
10: user terminal
20: MEC
30: router
310: edge core router
330: core router
350: route core router
40: producer terminal
50: SDN controller

What is claimed is:

1. A content caching optimization method comprising:
   transmitting, by a user terminal, a content request;
   predicting, by a mobile/multiple access edge computing device (MEC), the number of requests for each content to be requested later based on the content request received from the user terminal; and
   calculating, by a software-defined network (SDN) controller comprising a processor, a content popularity using the number of requests for each content predicted by the MEC and performing content caching optimization based on the calculated content popularity and a preset content priority,
   wherein performing the content caching optimization comprises:
   aggregating the number of requests for each content received from the MEC for a preset input time;
   normalizing the aggregated number of requests for each content to calculate a content popularity;
   calculating an optimal solution based on the content popularity and the content priority using a binary particle swarm optimization (BPSO) algorithm, wherein the optimal solution is calculated using an objective function that is redefined through a penalty function of different constraints including a quality of experience (QoE) constraint that is an average content transmission cost to be satisfied according to the content priority;
   performing the content caching optimization using the calculated optimal solution to derive a content caching state for minimizing a cost of transmitting the content;
   transmitting the content caching state to the MEC device; and
   upon receiving the content caching state, implementing, by the MEC device, an information-centric networking (ICN)-based caching is based on the content caching state.

2. The content caching optimization method of claim 1, wherein predicting the number of requests for each content comprises,
   collecting a content request received from the user terminal for a preset input time; and
   predicting the number of requests for each content for a preset output time by inputting the collected content request to a previously trained time-series prediction machine learning model.

3. The content caching optimization method of claim 1, wherein performing the content caching optimization to derive the content caching state comprises,
   using a quality of experience (QoE) constraint that an average content transmission cost is to be satisfied according to the content priority to calculate the optimal solution based on the content popularity and the content priority, and
   determining that the QoE constraint is satisfied when an average content transmission cost of the content for which the content priority is set is smaller than a preset threshold value.

4. The content caching optimization method of claim 3 further comprises,
   connecting, by one or more routers, a path for transmitting the content provided by a producer terminal to the user terminal; and
   performing, by the MEC, the router, and the producer terminal, content caching based on the content caching state received from the SDN controller through an information-centric networking (ICN) caching procedure and updating a forwarding information base (FIB) which is a routing table of an ICN.

5. A content caching optimization system comprising:
   a producer terminal configured to generate and provide content;
   a user terminal configured to transmit a content request according to a user and receive content according to the content request;
   a mobile/multiple access edge computing device (MEC) configured to predict the number of requests for each content to be requested later based on the content request received from the user terminal; and
   a software-defined network (SDN) controller comprising a processor configured to calculate a content popularity using the number of requests for each content predicted by the MEC and perform content caching optimization based on the calculated content popularity and a preset content priority, wherein the SDN controller:
aggregates the number of requests for each content received from the MEC for a preset input time;
calculates a content popularity by normalizing the aggregated number of requests for each content;
calculates an optimal solution based on the content popularity and the content priority using a binary particle swarm optimization (BPSO) algorithm, wherein the optimal solution is calculated using an objective function that is redefined through a penalty function of different constraints including a quality of experience (QoE) constraint that is an average content transmission cost to be satisfied according to the content priority;
derives a content caching state for minimizing a cost of transmitting the content by performing the content caching optimization using the calculated optimal solution; and
transmits the content caching state to the MEC device;
wherein the MEC device:
upon receiving the content caching state, implements an information-centric networking (ICN)-based caching is based on the content caching state.

6. The content caching optimization system of claim 5, wherein the MEC,
collects a content request received from the user terminal for a preset input time, and
predicts the number of requests for each content for a preset output time by inputting the collected content request to a previously trained time-series prediction machine learning model.

7. The content caching optimization system of claim 5, wherein the SDN controller,
uses a quality of experience (QoE) constraint that an average content transmission cost is to be satisfied according to the content priority to calculate the optimal solution based on the content popularity and the content priority, and
determines that the QoE constraint is satisfied when an average content transmission cost of the content for which the content priority is set is smaller than a preset threshold value.

8. The content caching optimization system of claim 7 further comprises,
a router configured to connect a path for transmitting the content provided by the producer terminal to the user terminal,
wherein the MEC, the router, and the producer terminal perform content caching based on the content caching state received from the SDN controller through an information-centric networking (ICN) caching procedure and update a forwarding information base (FIB) which is a routing table of an ICN.

* * * * *